US009302852B2

(12) United States Patent
Byrne et al.

(10) Patent No.: US 9,302,852 B2
(45) Date of Patent: Apr. 5, 2016

(54) FOLDABLE CONVEYOR SUPPORT STRUCTURE WITH WRAP-AROUND CAPABILITY

(71) Applicant: TEREX GB LIMITED, Dungannon Tyrone (GB)

(72) Inventors: Richard Byrne, Dungannon Tyrone (GB); Lee Johnston, Lisbellaw Fermanagh (GB)

(73) Assignee: Terex GB Limited, Dungannon, Tyrone (GB)

( * ) Notice: Subject to any disclaimer, the term of this patent is extended or adjusted under 35 U.S.C. 154(b) by 0 days.

(21) Appl. No.: 14/352,378

(22) PCT Filed: Oct. 19, 2012

(86) PCT No.: PCT/EP2012/070830
§ 371 (c)(1),
(2) Date: Apr. 17, 2014

(87) PCT Pub. No.: WO2013/057300
PCT Pub. Date: Apr. 25, 2013

(65) Prior Publication Data
US 2014/0367222 A1 Dec. 18, 2014

(30) Foreign Application Priority Data
Oct. 20, 2011 (GB) .................................. 1118144.3

(51) Int. Cl.
*B02C 21/02* (2006.01)
*B65G 15/26* (2006.01)
(52) U.S. Cl.
CPC ................ *B65G 15/26* (2013.01); *B02C 21/02* (2013.01)

(58) Field of Classification Search
CPC ................................ B65G 15/26; B02C 21/02
See application file for complete search history.

(56) References Cited

U.S. PATENT DOCUMENTS

| 4,598,875 | A | * | 7/1986 | Bronson | ................. | B02C 23/12 |
| | | | | | | 241/101.76 |
| 5,419,502 | A | * | 5/1995 | Morey | ................. | B02C 18/067 |
| | | | | | | 241/101.761 |

(Continued)

FOREIGN PATENT DOCUMENTS

| CN | 201353523 Y | 12/2009 |
| EP | 0424591 A1 | 5/1991 |

(Continued)

OTHER PUBLICATIONS

United Kingdom Intellectual Property Office Search Report dated Feb. 14, 2012 for GB1118144.3.

(Continued)

*Primary Examiner* — Gene Crawford
*Assistant Examiner* — Thomas Randazzo
(74) *Attorney, Agent, or Firm* — Burns & Levinson LLP; John C. Serio; Marlo Schepper Grolnic (57) ABSTRACT

An aggregate processing apparatus comprising a conveyor support structure having a base section located at a side of the apparatus, a mid-section pivotably coupled to the base section and a head section pivotably coupled to the mid-section. The conveyor support structure is operable between a deployed state, in which the mid-section and the head section project from the side, and a transport state in which the mid-section is folded to extend across the first face and the head section is folded with respect to the mid-section to extend across an end face of the apparatus.

13 Claims, 12 Drawing Sheets

(56) References Cited

U.S. PATENT DOCUMENTS

| | | | | |
|---|---|---|---|---|
| 6,095,320 | A * | 8/2000 | DeMong | B65G 15/00 198/812 |
| 6,186,338 | B1 * | 2/2001 | Douglas | B02C 21/02 209/241 |
| 6,705,449 | B2 * | 3/2004 | Wagstaffe | B07B 1/005 198/313 |
| 7,264,104 | B2 * | 9/2007 | Heeszel | B02C 21/02 198/314 |
| 7,461,746 | B1 * | 12/2008 | Egge | B02C 21/02 209/268 |
| 7,588,204 | B2 * | 9/2009 | Douglas | B02C 21/02 241/101.76 |
| 7,806,353 | B2 * | 10/2010 | Douglas | B02C 21/02 241/101.74 |
| 8,118,246 | B2 * | 2/2012 | Yamaguchi | B02C 25/00 241/101.74 |
| 8,591,155 | B2 * | 11/2013 | Lawlor | B60P 3/062 410/45 |
| 8,985,486 | B2 * | 3/2015 | Van der Galien | A01G 3/002 241/101.763 |
| 2007/0089966 | A1 | 4/2007 | Gausman et al. | |
| 2007/0158479 | A1 | 7/2007 | Westerman et al. | |
| 2013/0313400 | A1 * | 11/2013 | Hannikainen | B02C 21/026 248/647 |

FOREIGN PATENT DOCUMENTS

| | | | |
|---|---|---|---|
| EP | 0654427 A1 | 5/1995 | |
| FR | 2507529 A1 | 12/1982 | |
| GB | 2283721 | * 11/1993 | B65G 41/00 |
| GB | 2282361 A | 4/1995 | |
| GB | 2283721 A | 5/1995 | |
| WO | 2007093645 A2 | 8/2007 | |

OTHER PUBLICATIONS

International Search Report dated May 23, 2013 for PCT/EP2012/070830.

* cited by examiner

FIG. 12

ND STAGE APPLICATION

FOLDABLE CONVEYOR SUPPORT STRUCTURE WITH WRAP-AROUND CAPABILITY

CROSS-REFERENCE TO RELATED APPLICATIONS

This application is a U,S. national stage application under 35 U.S.C. 371 of co-pending International Application No. PCT/EP2012/070830 filed on Oct. 19, 2012 and entitled FOLDABLE CONVEYOR SUPPORT STRUCTURE WITH WRAP-AROUND CAPABILITY, which in turn claims priority to Great Britain Patent Application No, 1118144.3, filed on Oct. 20, 2011, which is incorporated by reference herein in its entirety for all purposes.

FIELD OF THE INVENTION

The present invention relates to foldable support structures for conveyors, especially belt conveyors. The invention relates particularly but not exclusively to foldable conveyors for aggregate processing apparatus.

BACKGROUND TO THE INVENTION

Aggregate processing apparatus may include a plurality of conveyors for transporting aggregate material to or from the apparatus. Typically, the conveyors include one or more side conveyors, which extend laterally from the processing apparatus during use. A problem with such conveyors is that transporting or moving the aggregate processing apparatus can be difficult or impossible when they are deployed. For example, when being carried by a transport vehicle, the aggregate processing apparatus must fit onto or into the vehicle as well as complying with any height and/or width restrictions that may be applicable to public roads. To this end, side conveyors are often provided with a foldable support structure that allows them to be folded between the deployed state and a more compact transport state.

It would be desirable to provide an improved foldable support structure for conveyors.

SUMMARY OF THE INVENTION

A first aspect of the invention provides an aggregate processing apparatus comprising a conveyor support structure comprising a base section located at a first face of said apparatus, a mid-section pivotably coupled to said base section and a head section pivotably coupled to said mid-section, wherein said conveyor support structure is operable between a deployed state, in which said mid-section and said head section project from said first face, and a transport state in which said mid-section is folded to extend across said first face and said head section is folded with respect to said mid-section to extend across a second face of the apparatus, said second face being non-parallel with said first face.

A second aspect of the invention provides a conveyor support structure comprising a base section, a mid-section pivotably coupled to said base section and a head section pivotably coupled to said mid-section, wherein said conveyor support structure is operable between a deployed state in which the respective obverse face of said mid-section and said head section are substantially co-planar or parallel, and a transport state in which said respective obverse faces are non-coplanar and non-parallel.

Hence, the preferred conveyor structure, and the conveyor of which it is part during use, can advantageously be folded, or wrapped, around, for example, an adjacent side and end of the aggregate processing apparatus. This gives greater flexibility in determining where to locate the conveyor/conveyor structure while ensuring that it does not unduly add to the dimensions of the apparatus during transport.

A third aspect of the invention provides an aggregate processing apparatus comprising a conveyor support structure comprising at least one foldable section, wherein said conveyor support structure is operable into and out of a transport state in which at least one of said at least one foldable section is folded to extend across a face of said apparatus, wherein said apparatus includes at least one other foldable section foldable into and out of a transport state in which it extends across, and is preferably disposed substantially parallel with, said face to define a gap therebetween, wherein said conveyor support structure is configured such that at least part of said at least one of said at least one foldable section in its transport state is located in said gap. Typically, said at least one further foldable section comprises at least part of a hopper wall.

Advantageously this arrangement facilitates achieving a relatively close fit between the conveyor (and/or conveyor structure) and the apparatus during transport and so helps to reduce the dimensions of the apparatus during transport.

A fourth aspect of the invention provides a conveyor support structure comprising a boom structure configured to carry at least one roller recessed with respect to the body of the boom structure such that only part of said at least one roller projects beyond the obverse surface of the body.

Advantageously, this arrangement reduces the depth of the conveyor structure (and therefore of the associated conveyor) and so helps to reduce the dimensions of the apparatus during transport Preferred features are recited in the dependent claims.

Further advantageous aspects of the invention will become apparent to those ordinarily skilled in the art upon review of the following description of a preferred embodiment and with reference to the accompanying drawings.

BRIEF DESCRIPTION OF THE DRAWINGS

An embodiment of the invention is now described by way of example and with reference to the accompanying drawings in which.

DETAILED DESCRIPTION OF THE DRAWINGS

Referring now in particular to FIGS. 1 to 4 of the drawings, there is shown, generally indicated as 10, an aggregate processing apparatus. The aggregate processing apparatus 10 is configured for performing, by way of example, aggregate screening and, as such, comprises an aggregate screening plant 12. Alternatively, however, the apparatus 10 may be configured to perform one or more of a plurality of processes, such as feeding, screening, separating, crushing and/or washing, on one or more types of aggregate material, for example rocks, stones, gravel, sand and/or soil, or any other material that is quarried, mined or excavated. To this end, the apparatus 10 may include one or more material processing plants adapted to perform one or more of the foregoing processes.

Typically, the aggregate processing apparatus 10 is mobile and comprises one or more wheels and/or tracks 11 mounted on a chassis 13. The apparatus 10 is usually self-propelled and to this end may comprise a drive system (not shown), e.g. comprising an engine, for driving the wheels/tracks 11. In any event, the apparatus 10 may include a power plant 9, which may comprise the engine and other components of the drive system and/or other apparatus for powering the apparatus, e.g. hydraulic and/or pneumatic apparatus for powering rams.

In the illustrated example, the aggregate processing apparatus 10 includes a front conveyor 14 and a side conveyor 16 for transporting aggregate material to and/or from the apparatus 10. A feed hopper 15 is provided above the screening apparatus 12, the screened material being output from the apparatus 10 by one or more of the conveyors 14, 16. The conveyors 14, 16 are usually belt-type conveyors, although the belts are not shown in the drawings. Typically, each of the conveyors 14, 16 is configurable to adopt a transport (folded) state and a use (deployed) state, the respective transport states being depicted in FIG. 1 of the drawings and the respective use states being depicted in FIG. 2 of the drawings. It will be understood that the invention is not limited to apparatus of the type shown in FIGS. 1 to 4, and may for example be used with other configurations of material processing plant(s) and/or conveyor(s).

Figure 1:
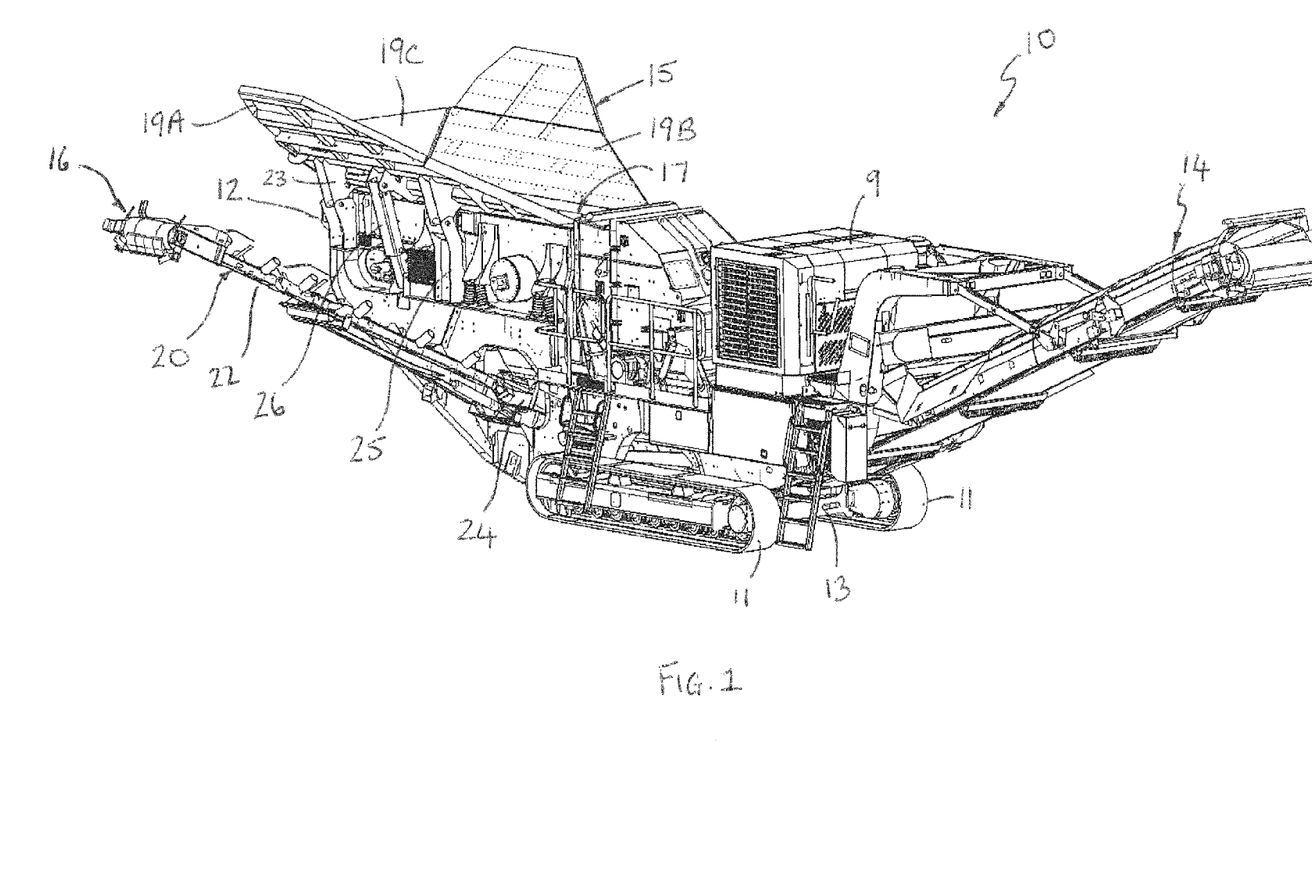
FIG. 1 is a perspective view of an aggregate processing apparatus including a conveyor support structure embodying one aspect of the present invention, and shown with its conveyors and hopper flares in a deployed state.
Figure 2:
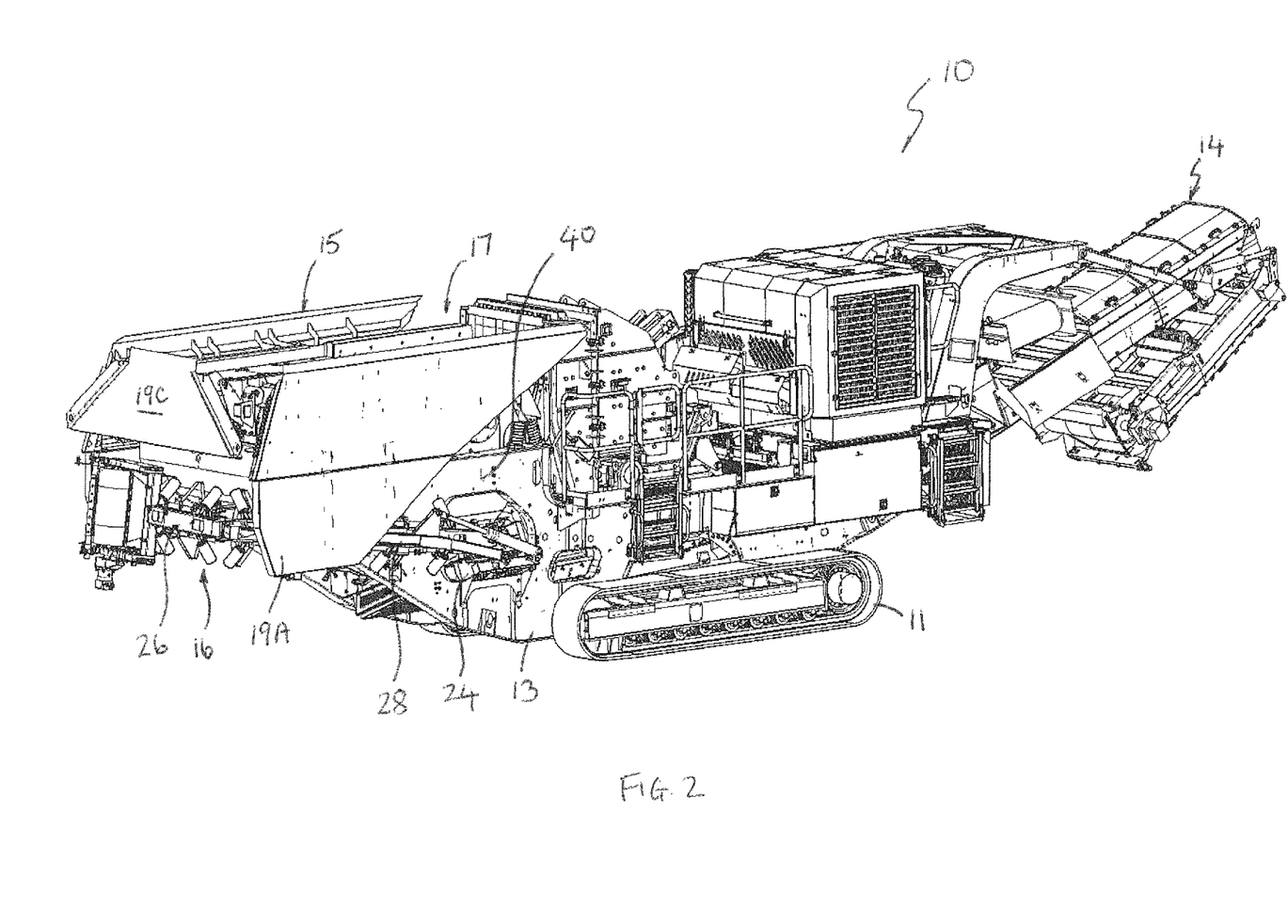
FIG. 2 is a perspective view of the apparatus of FIG. 1, shown with its conveyors and hopper flares in a transport (folded) state.
Figure 3:
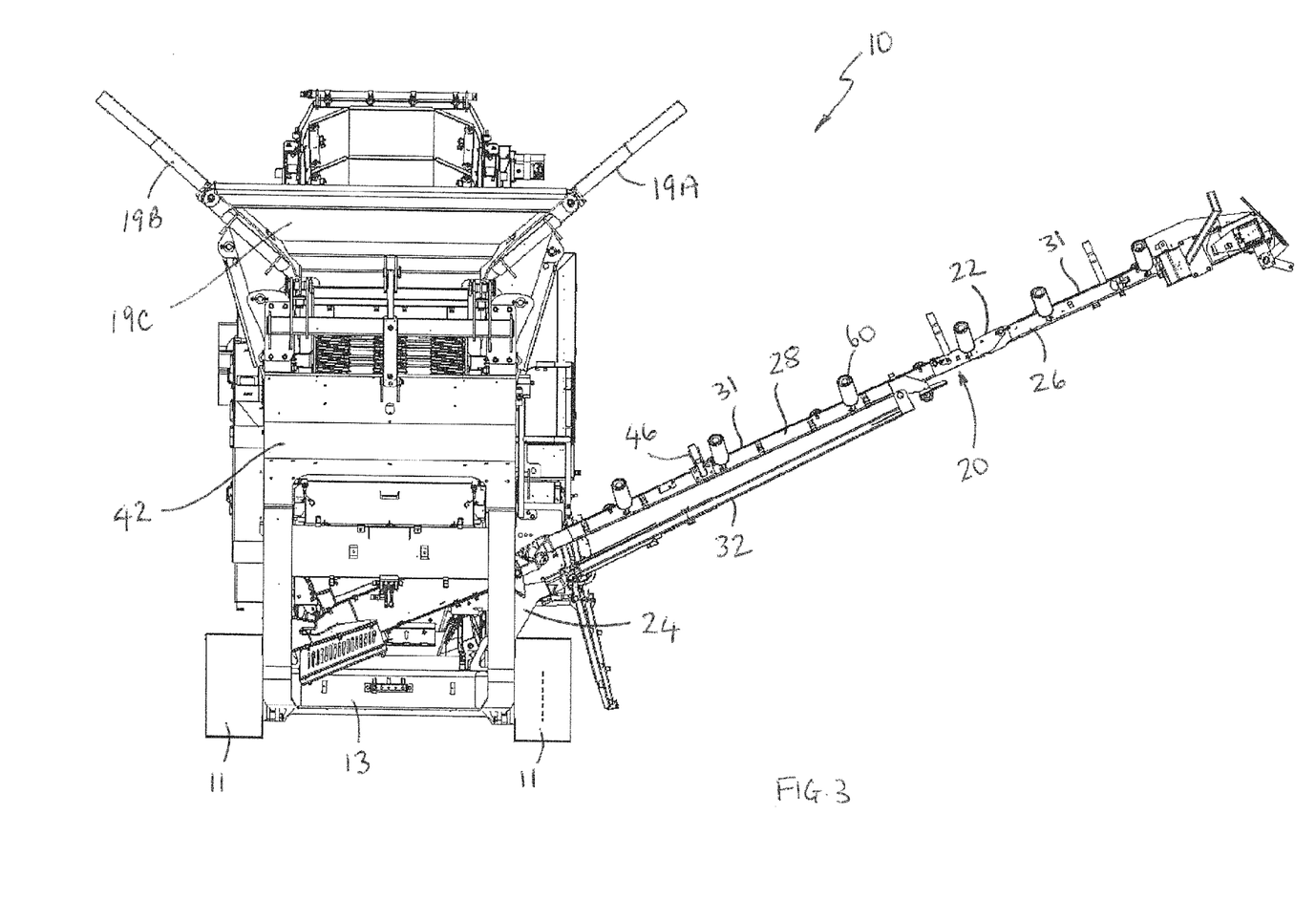
FIG. 3 is an end view of the apparatus of FIG. 1, shown with its conveyors and hopper flares in the deployed state.

In preferred embodiments, the hopper 15 is shaped to define a mouth 17 and comprises at least one wall section 19 arranged to guide aggregate material (not shown) into the mouth 17 when in a use state (as shown in FIGS. 1 and 3). Typically, there is a respective wall section 19A, 19B at each side of the hopper 15 and at at least one end (19C) of the hopper 15. Hence, when deployed, the wall sections 19 extend at least partially around the mouth 17. In the use state, the wall sections 19 extend upwardly from the mouth 17, and preferably also extend laterally away from the hopper 15. As such, the wall sections 19 may be referred to as flares. In the use state, the height of the flares 19 can be problematic when transporting the apparatus 10. Each flare 19 is therefore operable to adopt a non-use, or transport, state in which it extends downwardly with respect to the mouth 17. Conveniently, this is achieved by configuring the flares 19 to fold with respect to the hopper 15, typically by means of a pivot mechanism. In the non-use state (FIGS. 2 and 4) the flares 19 extend alongside a respective side or end of the apparatus 10, and are typically substantially parallel with the respective side or end. Advantageously, the flares 19 are located close, e.g. substantially against, the respective side or end of the apparatus 10 when folded to minimize the overall dimensions of the apparatus 10. Preferably, in respect of at least one flare 19, the arrangement is such that a gap is defined between the flare 19, when folded, and the side/end of the apparatus 10. For example, in the illustrated embodiment, flares 19A, 19B each folds against a respective side of the apparatus 10 such that a gap 21 is defined between the flare and the side. This may be achieved by suitable configuration of the linkage that allows the respective flare 19 to fold. For example, flare 19A may be coupled to the apparatus 10 by one or more pivot linkages comprising first and second supports 23, 25 pivotably coupled to one another. A suitable gap 21 can be created by selection of the shape and/or size of one or both of the supports 23, 25 and/or the respective location at which they are coupled, respectively, to the flare 19A and apparatus 10. Actuation of the flare 19A between the use and non-use states may be effected by any suitable actuator(s), for example a ram assembly 26. Similar pivoting mechanisms may be used to actuate the other flares 19B, 19C.

Figure 4:
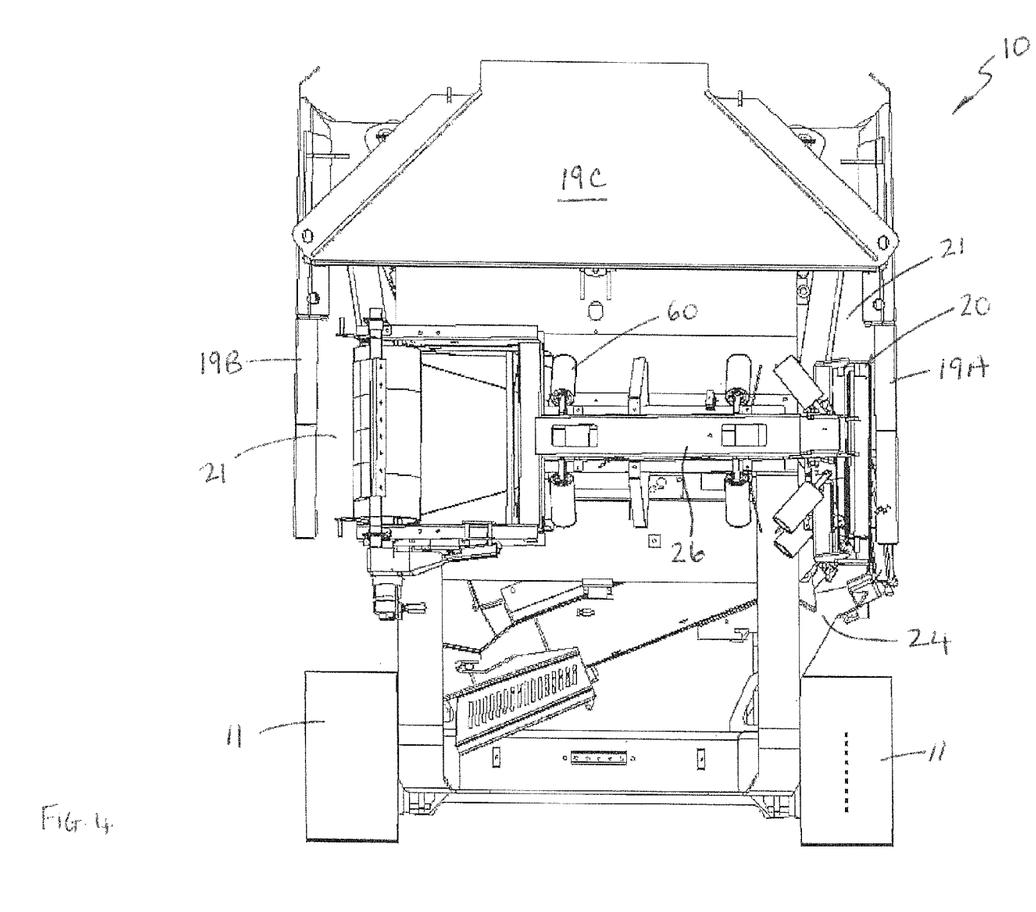
FIG. 4 is an end view of the apparatus of FIG. 1, shown with its conveyors and hopper flares in the transport (folded) state.
Figure 5:
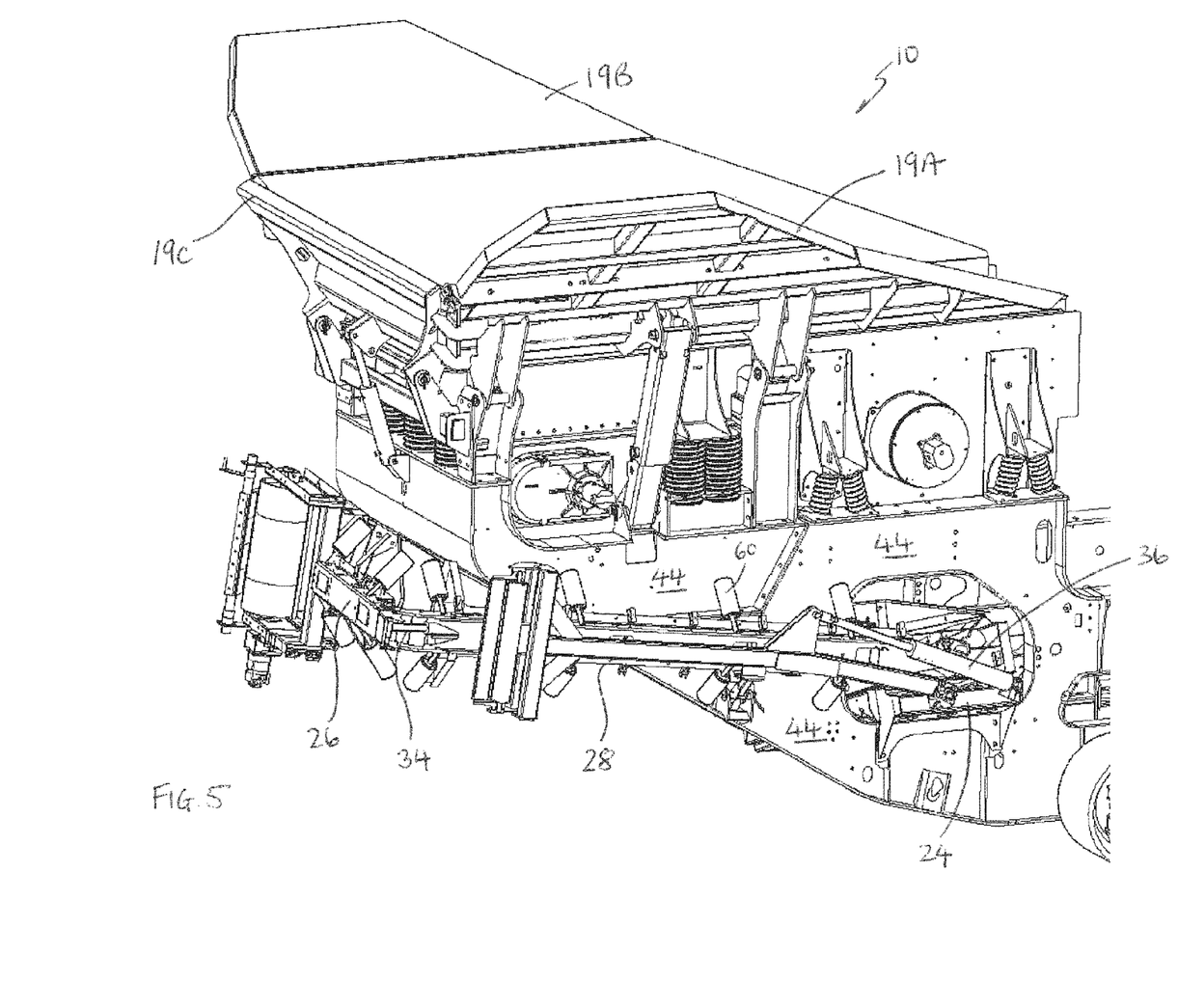
FIG. 5 is a perspective view of an end of the apparatus of FIG. 1, showing the conveyor support structure in its transport (folded) state and the hopper flares in a use state.
Figure 6:
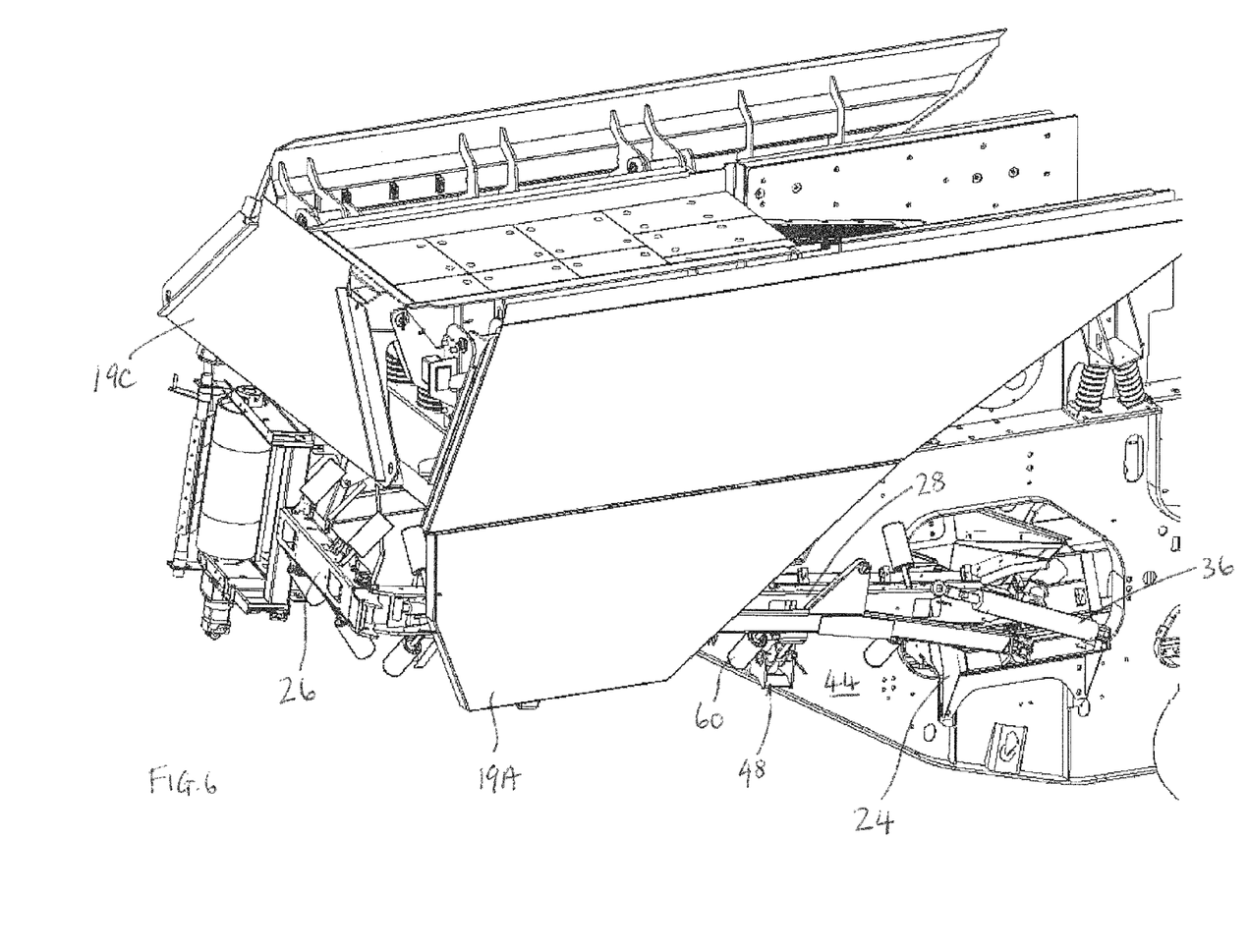
FIG. 6 is a perspective view of said end of the apparatus of FIG. 1, showing the conveyor support structure in its transport (folded) state and the hopper flares in a transport (folded) state.

The aggregate processing apparatus 10 further includes a conveyor support structure 20 embodying one aspect of the present invention. In preferred embodiments, the conveyor support structure 20 forms part of a side conveyor that is located at a side of the apparatus 10 and is deployable to extend outwardly from the apparatus 10, typically in a direction that is substantially perpendicular with the longitudinal axis of the apparatus 10 (FIGS. 1 and 3), although it may alternatively extend obliquely with respect to the longitudinal axis of the apparatus 10 when deployed. In FIGS. 2 and 4, the support structure 20 is shown in a folded, or transport, state corresponding to a folded, or transport, state of the side conveyor. In the transport state, the support structure 20 is folded substantially against the apparatus 10. Side conveyors are typically belt-type conveyors and so the support structure 20 is configured to allow a conveyor belt (not shown) to be fitted thereto, as is described in more detail hereinafter. The support structure 20 may alternatively form part of any other suitable conveyor, e.g. an end conveyor.

The conveyor support structure 20 has an obverse face 31 that faces generally upwardly during use. The obverse face 31 corresponds substantially with the obverse face of the conveyor of which the structure 20 forms part. Where the conveyor includes a conveyor belt, the top flight of the belt runs along the obverse face 31 during use. When deployed, the conveyor may be said to lie substantially in a plane along which material is carried by the conveyor during use, and which is substantially coincident or parallel with the obverse face 31.

Figure 7:
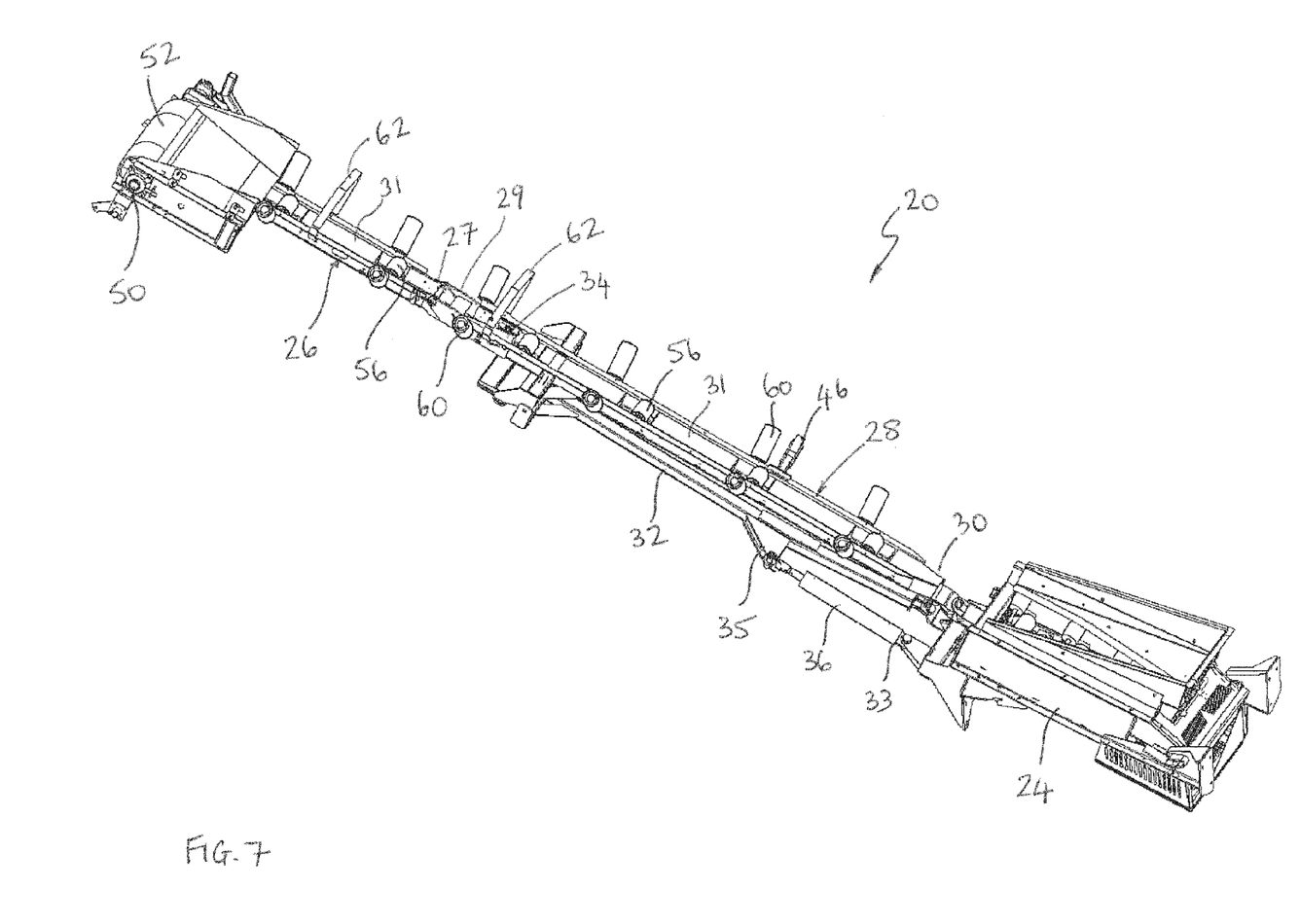
FIG. 7 is a perspective view of said conveyor support structure shown in its deployed state.
Figure 8:
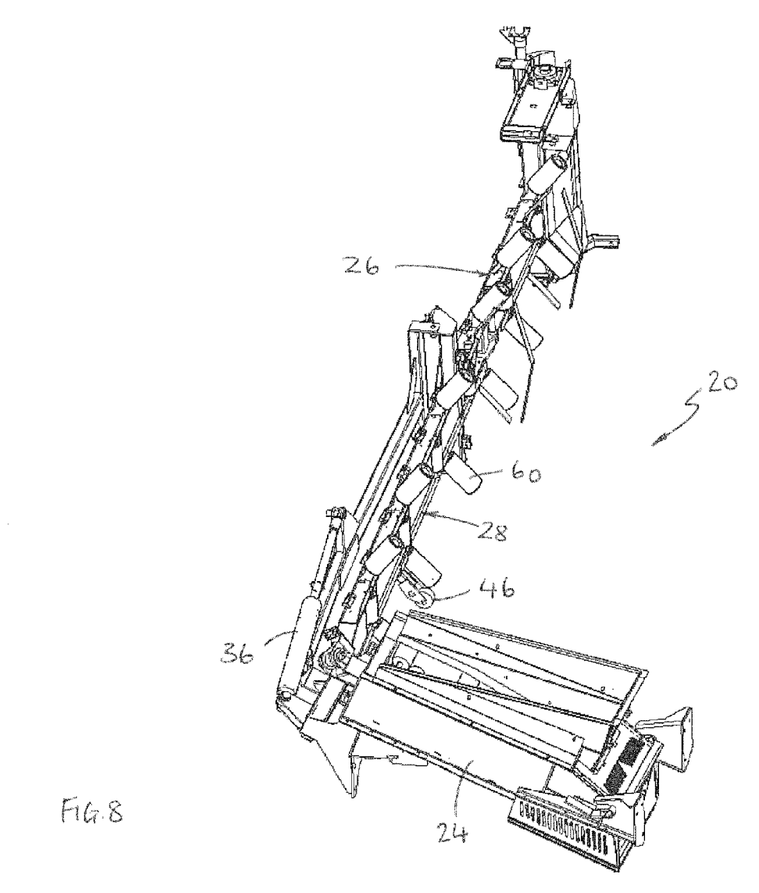
FIG. 8 is a perspective view of said conveyor support structure shown in a semi-folded state intermediate said deployed state and said transport (folded) state.
Figure 9:
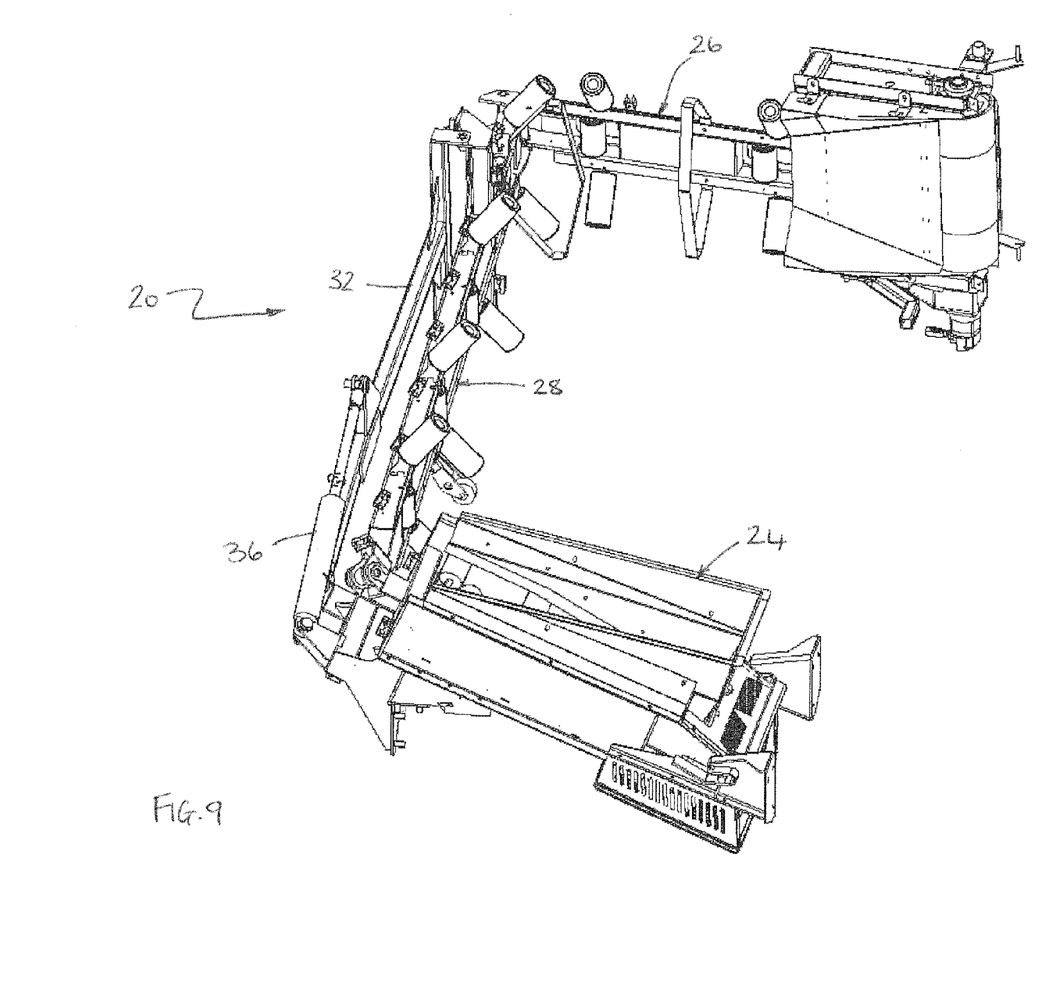
FIG. 9 is a perspective view of said conveyor support structure shown in said transport (folded) state.

Referring now in addition to FIGS. 7 to 9, the conveyor support structure 20 is described in more detail. The conveyor support 20 includes a boom structure 22 that is pivotable with respect to a base section 24 between a folded, or transport, state (FIG. 9) and a deployed state (FIG. 7), which correspond respectively to the transport and deployed states of the conveyor of which the support structure 20, in use, forms part. The base section 24 is mountable, preferably removably, on the apparatus 10 or other host apparatus. Alternatively, the base section 24 may be integrally formed with the apparatus 10 or other host apparatus.

The boom structure 22 comprises a head section 26 and a mid-section 28, the mid-section 28 being located between the head section 26 and the base section 24. The head section 26 and mid-section 28 are pivotably coupled to one another, preferably at respective ends 29, 27. The coupling, which may comprise any suitable conventional coupling or joint, is configured to allow relative pivotable movement between the sections 26, 28 about at least one axis, preferably only one axis. In the preferred embodiment, the pivot axis traverses (preferably substantially perpendicularly, but otherwise obliquely) the longitudinal axis of the boom structure 22. In some embodiments, the pivotable coupling may also allow relative pivoting movement about a second axis that is substantially coincident or parallel with the longitudinal axis of the boom structure 22.

An actuator 34 is coupled between the mid section 28 and the head section 26. The actuator 34 typically comprises a powered linear actuator, for example a ram, preferably a double-acting ram, powered in any suitable manner, e.g. hydraulically, electrically or pneumatically. The actuator 34 is arranged to move the head section 26 between its folded and deployed states. The actuator 34 is operable by a control device (not shown), which may be located on the apparatus 10, or by a wired or wireless remote controller (not shown). The actuator 34 is pivotably coupled to the mid-section 28 and to the head section 26. The couplings may comprise any suitable conventional coupling or joint.

The conveyor support structure 20 may be adapted to carry a conveyor in any suitable manner. In this example, it is assumed that the conveyor comprises a conveyor belt (not shown). To this end, the head section 26 comprises a roller support 50 at its free end, the roller support carrying a conveyor end drum 52. The base section 24 also includes a roller support (not visible) for carrying a conveyor end drum (not visible). One or more of the head section 26, mid-section 28 and base section 24 may include one or more roller supports with one or more rollers, e.g. idler rollers. In the illustrated embodiment, the head section 26 and mid-section 28 include roller supports (not visible) for respective idler (or centre) rollers 56, which traverse the body of the head section 26 or mid-section 28 respectively.

The rollers 56 are rotatable about a respective axis that is substantially perpendicular with the longitudinal axis of the respective section 26, 28, i.e. transverse with respect to the respective section 26, 28. In use, the rollers 56 support the conveyor belt. One or more of the head section 26, mid-section 28 and base section 24 may include one or more roller supports (not visible) with one or more troughing rollers 60 and, optionally, a belt retainer 62. When fitted, the conveyor belt extends between the end rollers in an endless loop, the top flight of which is shaped by the troughing rollers 60 when the conveyor is deployed.

In the preferred embodiment, either one or both of the sections 26, 28 comprises a frame or other support member, the frames or other support members being located end-to-end and pivotably coupled to one another in the manner described above. Alternatively the head section 26 and mid-section 28 may each comprise a respective beam, the beams being located end-to-end and pivotably coupled to one another in the manner described above. Typically, the head section 26 and mid-section 28 are substantially disposed in a common plane in the deployed state. Typically, the boom structure 22 is substantially linear when deployed. Consequently, the top flight of the conveyor, when deployed, is substantially linear.

The mid-section 28 is pivotably coupled to the base section 24, preferably at its end 30, opposite end 27. The coupling, which may comprise any suitable conventional coupling or joint, is configured to allow relative pivotable movement between the mid-section 28 and the base section 24 about at least one axis. The coupling is configured to allow the mid-section 28 to pivot between a folded state (FIGS. 2, 5, 8 and 9) in which it is located substantially against the apparatus 10, and a deployed state in which it projects from the apparatus 10, preferably substantially perpendicularly to the longitudinal axis of the apparatus 10. As is described in further detail hereinafter, the coupling is preferably such that it allows the mid-section to pivot about first and second mutually perpendicular axes. The coupling may for example comprise a knuckle joint.

An actuator 36 is coupled between the base section 24 and the mid section 28. The actuator 36 typically comprises a powered linear actuator 36, for example a ram, preferably a double-acting ram, powered in any suitable manner, e.g. hydraulically, electrically or pneumatically. The actuator 36 is arranged to move the head section 28 between its folded and deployed states. The actuator 36 is operable by a control device (not shown), which may be located on the apparatus 10, or by a wired or wireless remote controller (not shown). The actuator 36 is pivotably coupled to the base section 24 and to the mid-section 28, preferably at respective opposite ends 33, 35. The coupling with the base section 24 may comprise any suitable conventional coupling or joint. The other end 35 of the actuator 36 is coupled to the mid-section 28 by means of any suitable pivotable coupling. In preferred embodiments, a support 32 extends between the base section 24 and the mid-section 28 and is pivotable coupled to each to allow the support 32 to move with the mid-section 28 as it pivots between its folded and deployed states. End 35 of the actuator 36 is pivotably coupled directly to the support 32 (and thus indirectly coupled to the mid-section 28). This allows the actuator 36 to actuate the mid-section 28 without fouling the conveyor belt.

The actuators 34 and 36 may be operable independently of one another (by respective or a common control device) or their operation may be linked. In either case, the actuators 34, 36 may be operated simultaneously or in either sequence. Typically, when folding, actuator 36 is operated (fully or partly) before actuator 34 is operated and, when deploying, actuator 34 is operated (fully or partly) before actuator 36 is operated.

It will be apparent from the foregoing that, in preferred embodiments, the obverse face 31 of the support structure 20, and therefore of the conveyor, when deployed is substantially planar, but when folded comprises first and second non-coplanar parts corresponding to the head section 26 and mid-section 28 respectively. In typical embodiments, the head section 26 and mid-section 28 are substantially perpendicular to one another when in the folded/transport state and so the corresponding first and second parts of the obverse face are substantially perpendicular. This makes the support structure 20 particularly suited to folding around adjacent faces of the apparatus 10 as is described in more detail below. In alternative embodiments, the head section 26 and mid-section 28 may be disposed obliquely with respect to one another in the transport state, typically at an obtuse angle.

Referring now to FIGS. 2, 4, 5 and 6 in particular, when the support structure 20 adopts its folded state, the mid-section 28 is located substantially against a side 40 of the apparatus 10, while the head section 26 is located substantially against an end 42 of the apparatus, the end 42 being adjacent and non-parallel with the side 40. In the illustrated embodiment, the side 40 and end 42 are substantially perpendicular with one another. In such cases, it is preferred that the mid-section 28 is foldable such that, when folded, it extends substantially parallel with the longitudinal axis of the apparatus. This allows a relatively simple pivotable coupling to be provided between the mid-section 28 and the head section 26, in particular a single axis pivot joint that traverses the boom structure substantially perpendicularly, which in turn allows a simple linear actuator to be used to effect relative movement between the mid-section and head section.

More generally, the apparatus 10 may be said to comprise a plurality of faces, including sides, ends, upper, lower, top or bottom faces, the conveyor support structure 20 being configured to fold or wrap around first and second adjacent non-parallel faces. Typically, one of the faces is a side or end of the apparatus 10, the other being an adjacent end or side respectively. Alternatively, one of the faces may be a side or end, the other being an adjacent top or upper surface, or an adjacent underside or lower face.

For a given location of the base section 24, the length of the mid-section 28 and head section 26 may be selected to suit the dimensions of the apparatus 10. Alternatively, for a desired length of boom structure 32, the location of the base section 24 may be chosen accordingly.

The configuration of the respective pivotable couplings between the base section and the mid-section and between the mid-section and the head section may be selected to suit the relative position of the first and second faces (e.g. side, end, upper or lower etc.) and the relative orientation between the faces (e.g. perpendicular, oblique etc.).

In preferred embodiments, the boom structure 32 is foldable around first and second adjacent faces that are substantially perpendicular to one another, in which case it is preferred that the mid-section 28 and head section 26, when folded, extend substantially parallel with a respective one of the three main orthogonal axes of the apparatus 10. For example, where the first face is a side or end and the second face is an end or side, respectively, then the mid-section 28 and head section 26, when folded, preferably extend substantially parallel with the longitudinal or transverse axis of the apparatus 10, as applicable. Alternatively, where one of the faces is a top face, then one or other of the mid-section or head section preferably extends substantially orthogonally to both the longitudinal and transverse axes of the apparatus 10.

In preferred embodiments, when in the folded state, the mid-section is oriented such that its obverse face 31, and consequently the corresponding obverse face of the conveyor, is substantially parallel with the face of the apparatus 10 against which it is folded. It is particularly preferred that the mid-section 28 is folded such that its obverse face 31, and consequently the obverse face of the conveyor, faces towards the face of the apparatus 10 against which it is folded. Similarly, when folded, it is preferred that head section 26 is oriented such that its obverse face 31, and consequently the corresponding obverse face of the conveyor, is substantially parallel with the face of the apparatus 10 against which it is folded. It is particularly preferred that the head section 26 is folded such that its obverse face 31, and consequently the obverse face of the conveyor, faces towards the face of the apparatus 10 against which it is folded.

When the mid-section 28 or head section 26 are folded substantially against the respective face of the apparatus 10, there need not necessarily be contact between the mid-section/head section and the respective face of the apparatus 10. Rather, the mid-section and preferably also the head section are, when folded, located adjacent to and extend alongside the respective face of the apparatus 10, preferably running substantially parallel with the respective face and advantageously in close proximity with the respective face.

In preferred embodiments where the obverse face of the mid-section and preferably also the head section face the apparatus 10, parts of the conveyor support structure 20 and/or conveyor components that project from the obverse face of the conveyor (e.g. the troughing rollers 60 and the retainers 62) may be positioned such that they project into, when folded, recesses or cavities 44 formed in the body of the apparatus 10. This reduces the extent to which the folded conveyor projects laterally from the apparatus 10.

Figure 10:
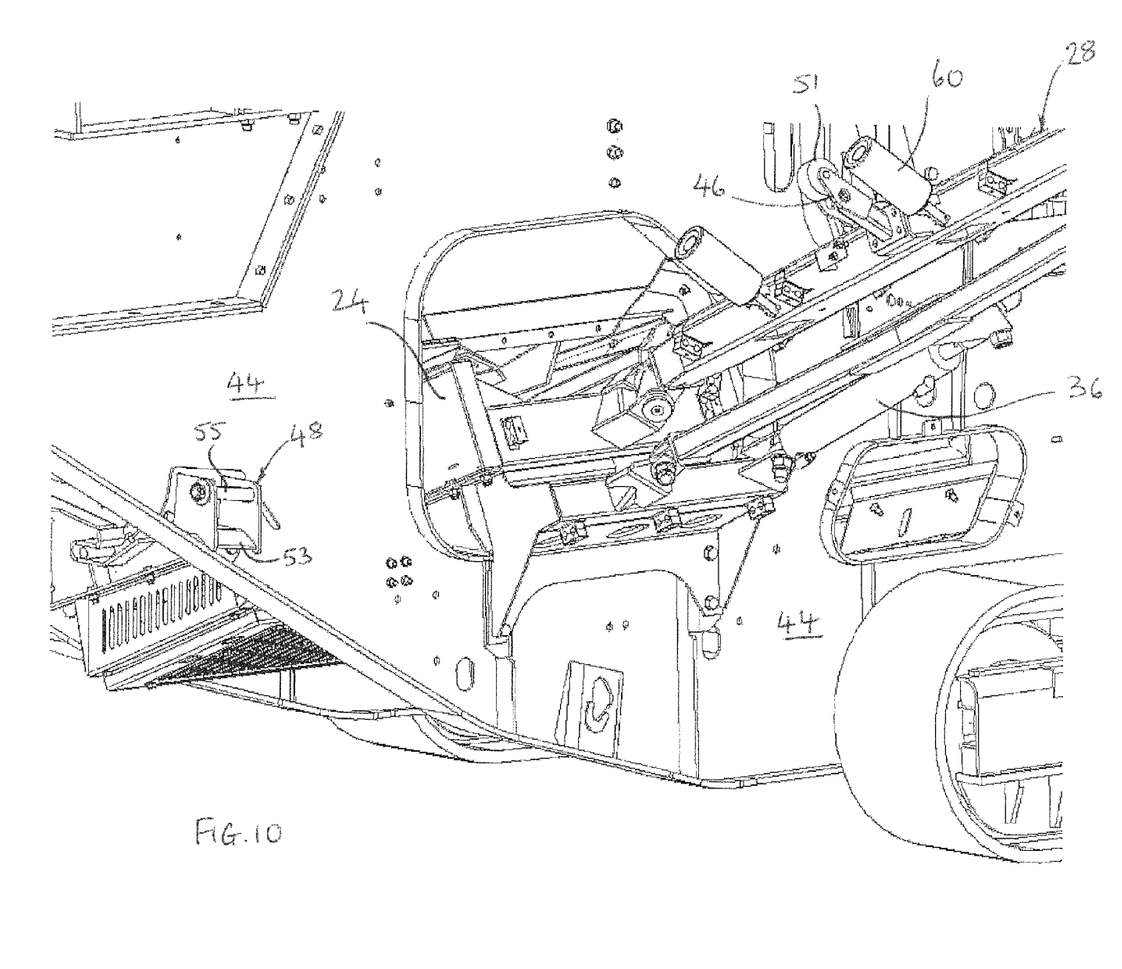
FIG. 10 is a perspective view of a detail of said apparatus, shown with said conveyor support structure in the deployed state and illustrating a buffer apparatus.
Figure 11:
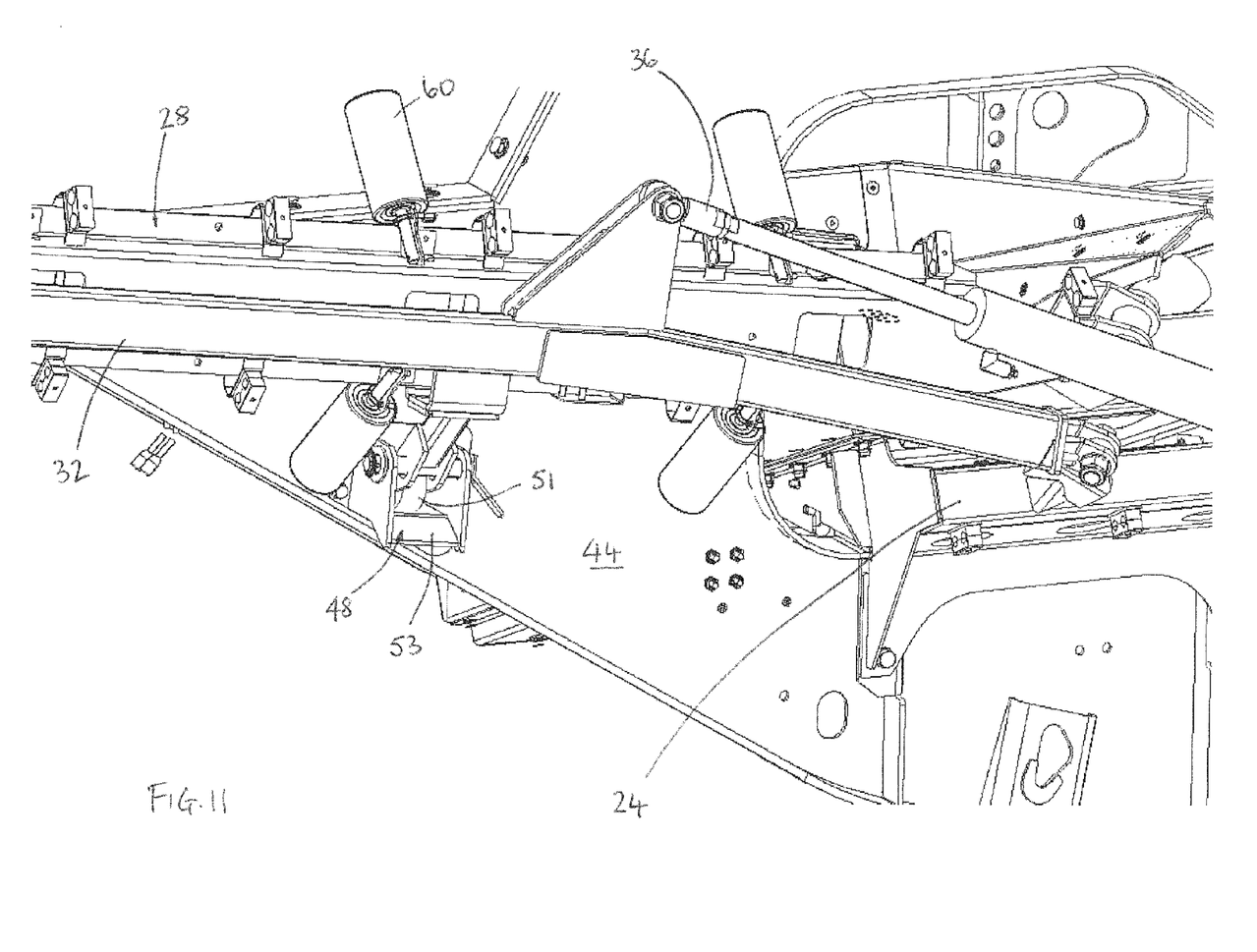
FIG. 11 is a perspective view of a detail of said apparatus, shown with said conveyor support structure in the transport (folded) state and illustrating a buffer apparatus.
Figure 12:
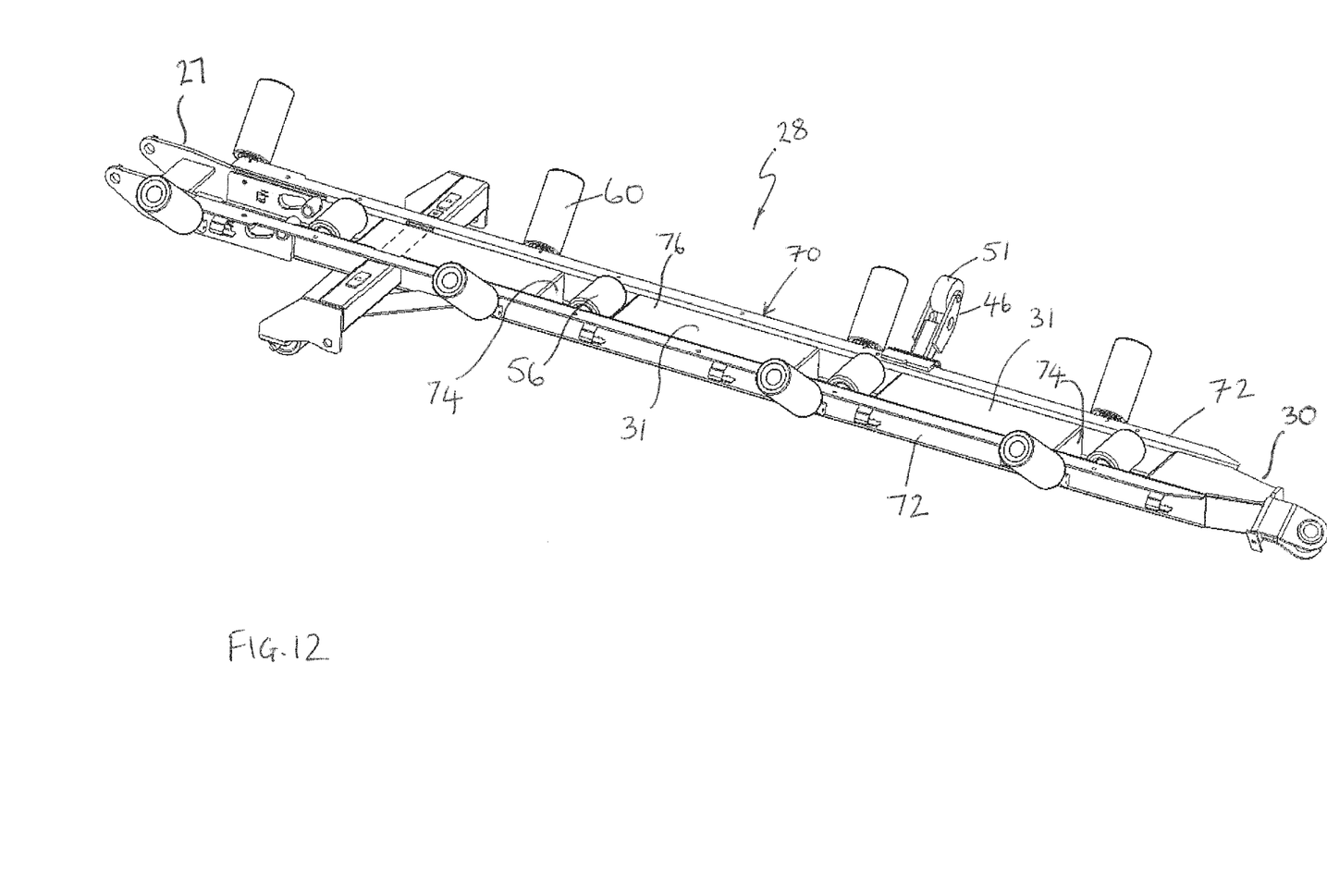
FIG. 12 is a perspective view of part of said conveyor support structure.

Preferably, at least one and optionally both of the mid-section 28 and head section 26 carries a stop device 46 (FIGS. 10 to 12) projecting from the structure 20 such that it engages with the respective face of the apparatus 10 when the structure 20 is folded. The stop device 46 is dimensioned and positioned to prevent other parts (in particular the troughing rollers 60) of the structure 20, and conveyor of which the structure 20 is part, from engaging with the apparatus 10 and so protects them from damage. For example, from FIGS. 10 to 12 it can be seen that the stop device 46 is substantially aligned with the troughing rollers 60 on one side of the structure 20 and is dimensioned to project further from the structure than the roller 60 do. Preferably, the respective face of the apparatus 10 carries a socket 48 for receiving the stop device 46 when the structure 20 is folded. Advantageously, the free end of the stop device carries a roller 51, the socket 48 being shaped and dimensioned to receive the roller 51 (preferably including a ramp 53 for this purpose), whereby during folding of the structure 20, engagement of the roller 51 with the socket 48, and in particular the ramp 53, causes the stop device 46 to be guided into the socket 48. Preferably, a locking mechanism 55 is provided for releasably securing the stop device 46 in the socket 48 and so helping to maintain the structure 20 in its folded position.

In preferred embodiments, the support structure 20 is positioned on the apparatus 10 such that, when folded, the head section 26 and/or the mid-section 28 is located below the hopper 15. For example, in the illustrated embodiment, the base section 24 is located at side 40 of the apparatus 10 and the support structure 20 is configured such that the mid-section 28, when folded, extends along side 40 beneath hopper 15. The head section 26, when folded, also extends below the hopper 15 at the end 42 in this instance. Alternatively, the base section 24 may located at end 42 of the apparatus 10 and the support structure 20 configured such that the mid-section 28, when folded, extends along end 42 beneath hopper 15, the head section 26, when folded, extending below the hopper 15 at the side 40. In either case, advantageously the arrangement is such that part of the boom structure 22 (and in particular at least part of the mid-section and/or at least part of the head section) is located between the respective flare 19, when folded, and the apparatus 10. For example, in the illustrated embodiment, the mid-section 28 extends through the gap 21 between flare 19A and the side 40. This causes the overall width of the apparatus 10 in the transport state to be narrower than the alternative arrangement in which the respective flare(s) is between the relevant part(s) of the boom structure 22 and the apparatus 10 when folded since, in the preferred arrangement, parts of the conveyor/boom structure can fit into recesses and cavities 44.

This preferred aspect of the invention is not limited to the flares of the hopper and, in alternative embodiments, the boom structure may be arranged to extend behind one or more foldable sections of any component of the apparatus 10.

In preferred embodiments, the or each respective idler roller 56 of at least part of the boom structure 22, for example the head section 26 and/or the mid-section 28, is recessed with respect to the body 70 of the boom structure 22. The body typically comprises a frame (as illustrated) or a beam. Referring in particular to FIG. 7, the preferred arrangement is such that only part of each roller 56 projects beyond the obverse surface 31 of the body 70, i.e. that at least part of each roller 56 is recessed with respect to the obverse surface 31 of the body 70. Conveniently, this is achieved by mounting each roller 56 in a cavity formed in the body 70. Where the body 70 comprises a frame, the cavity 74 may conveniently be formed between spaced apart frame members, for example substantially parallel frame members 72 which, in the illustrated embodiment, define respective sides of the body 70. Typically, the rotational axis of each roller is recessed with respect to the obverse face 31 of the body 70. For example, an axle or bearings for the roller 56 may extend between, or otherwise be located between, the walls of the cavity to create a transverse rotational axis for the roller. It is preferred that each roller 56 is associated with a respective cavity formed in the body 70, the inter-cavity regions of the body comprising support members 76. The recessed rollers 56 help to reduce the height of the boom structure along at least part or parts of its length and this makes it easier to fit the boom structure against the apparatus 10 when folded. This is especially useful in preferred embodiments where the boom structure 22 extends behind one or more folded flares 19.

It will be understood that the invention is not limited to side conveyors. More generally, a conveyor support structure embodying the invention is suitable for use with a conveyor that is deployable between a deployed state, in which it extends outwardly from a host apparatus, and a folded state, in which it is folded substantially against the host apparatus. For example, conveyor support structures embodying the invention may be used with conveyors located at an end of the apparatus 10.

The invention is not limited to the embodiment described herein which may be modified or varied without departing from the scope of the invention.

The invention claimed is:

1. An aggregate processing apparatus comprising a conveyor support structure comprising a base section, a mid-section pivotably coupled to said base section and a head section pivotably coupled to said mid-section, wherein said conveyor support structure is operable between a deployed state and a transport state, wherein said base section is located at a side of said apparatus, and in said deployed state said mid-section and said head section project from said side, and in said transport state said mid-section is folded to extend across said side and said head section is folded with respect to said mid-section to extend across an end of the apparatus, said end being adjacent and non-parallel with said side.

2. An apparatus as claimed in claim 1, wherein, in said transport state, said mid-section is folded substantially against said side and end respectively.

3. An apparatus as claimed in claim 1, wherein said conveyor support structure is configured such that in said transport state said mid-section and said head section are substantially perpendicularly disposed with respect to one another.

4. An apparatus as claimed in claim 1, wherein said conveyor support structure is configured such that in said deployed state the respective obverse face of said mid-section and said head section are substantially co-planar or parallel, and in said transport state said respective obverse faces are non-coplanar and non-parallel.

5. An apparatus as claimed in claim 1, wherein at least one of the head section and mid-section carries at least one roller recessed with respect to the body of the head section or mid-section respectively such that only part of said at least one roller projects beyond the obverse surface of the body.

6. An apparatus as claimed in claim 1, wherein said apparatus includes at least one foldable section foldable into and out of a transport state in which it extends across, and is preferably disposed substantially parallel with, said side to define a gap therebetween, wherein said conveyor support structure is configured such that at least part of said mid-section in its transport state is located in said gap.

7. An apparatus as claimed in claim 1, wherein said apparatus includes a hopper and a hopper flare that is foldable into and out of a transport state in which it extends across said end to define a gap between said hopper flare and said side, wherein said conveyor support structure is configured such that at least part of said head section in its transport state is located in said gap between said hopper flare and said side.

8. An apparatus as claimed in claim 1, wherein in the deployed state the conveyor support structure extends substantially perpendicularly or obliquely to the longitudinal axis of the aggregate processing apparatus, and in the transport state extends substantially parallel with said longitudinal axis.

9. An apparatus as claimed in claim 1, wherein the base section is coupled to the mid-section to allow the mid-section to pivot about first and second mutually perpendicular axes.

10. An apparatus as claimed in claim 1, wherein said conveyor support structure is configured such that in said transport state the obverse face of said mid-section faces said side.

11. An apparatus as claimed in claim 10, wherein at least one of said mid-section and said head section includes at least one part that projects from the respective obverse face, said conveyor support structure being configured such that, in said transport state, said at least one part projects in to a respective one of at least one recess or cavity formed in said apparatus.

12. An apparatus as claimed in claim 11, wherein said at least one part comprises at least one troughing roller.

13. An aggregate processing apparatus comprising a conveyor support structure comprising at least one foldable section, wherein said conveyor support structure is operable into and out of a transport state in which at least one of said at least one foldable section is folded to extend across a side of said apparatus, wherein said apparatus includes a hopper having a hopper flare that is foldable into and out of a transport state in which it extends across said side to define a gap between said hopper flare and said side, wherein said conveyor support structure is configured such that at least part of said at least one of said at least one foldable section in its transport state is located in said gap between said hopper flare and said side.

* * * * *